United States Patent [19]

Via

[11] 4,204,928
[45] May 27, 1980

[54] PHOTOPOLYMERIZABLE COMPOSITION STABILIZED WITH NITROGEN-CONTAINING AROMATIC COMPOUNDS

[75] Inventor: Francis A. Via, Yorktown Heights, N.Y.

[73] Assignee: Stauffer Chemical Company, Westport, Conn.

[21] Appl. No.: 950,208

[22] Filed: Oct. 10, 1978

Related U.S. Application Data

[62] Division of Ser. No. 773,370, Mar. 1, 1977, Pat. No. 4,141,807.

[51] Int. Cl.$^2$ ............................. C08F 2/46; C08F 4/00
[52] U.S. Cl. ..................... 204/159.23; 204/159.19; 260/45.8 N; 260/45.9 E; 260/45.8 SN; 260/45.8 NZ; 260/45.9 Q; 260/45.95 H; 260/45.9 QA
[58] Field of Search .............. 204/159.23; 260/45.8 N, 260/45.9 E, 45.95 H, 45.9 QA, 45.9 Q

[56] References Cited

U.S. PATENT DOCUMENTS

| | | | |
|---|---|---|---|
| 2,448,828 | 9/1948 | Renfrew | 204/162 |
| 2,647,086 | 7/1953 | Joyce | 204/158 |
| 3,819,495 | 6/1974 | Roskott et al. | 204/159.19 |
| 3,819,496 | 6/1974 | Roskott et al. | 204/159.19 |
| 4,141,807 | 2/1979 | Via | 204/159.23 |

*Primary Examiner*—Richard B. Turer
*Attorney, Agent, or Firm*—Francis A. Via

[57] ABSTRACT

A stabilized photopolymerizable composition comprising photopolymerizable ethylenically unsaturated monomeric compounds, a photoinitiator and at least one nitrogen-containing aromatic compound as a stabilizer.

12 Claims, No Drawings droxyphenyl) pyridyl; 4-hydroxy-2,2'-dipyridyl; 2,2'-azobis-pyridyl; 2-pyridylazobenzene; 1-(2-pyridylazo)-2-naphthol; 2-(phenylazo)-pyridine; phenyl, 2-pyridyl disulfide; 2,2'-dipyridyl disulfide; 8-hydroxyquinoline; 2,8'-dihydroxyquinoline; 2 nitroso-1-naphthol; 1 nitroso-2-naphthol; 1-(2-pyridylazo)-3-naphthol; 1-(2-pyridylazol)-2-naphthol; 2-mercapto-benzimidazole; 2-mercapto-(benzoxazole); 2-mercapto-2-(benzthiazole); 2-mercapto -1-methyl benzimidazole; etc.

The nitrogen-containing aromatic compounds I are known compounds; many of them are commercially available. They are readily prepared by known methods. Thus, compounds I where $R^1$ and $R^2$ are as described in a) are readily prepared from various aromatic starting materials. For example, where X is zero, the dipyridyls and phenylpyridyls are conveniently prepared by the method described by Wibaut and Overhoff in Rec. trav. chim. 47, 761 (1928). Where X is sulfur, 2-(phenylthio)-pyridines can be prepared by reacting a 2-bromopyridine with diphenyl sulfide in the presence of a tertiary amine as described by L. D. Quinn et. al. in J. Org. Chem. 26, 4944 (1961) while the analogous reaction of a 2-bromopyridine with dipyridyl sulfide would provide 2,2'-dipyridosulfide. The corresponding compounds where X is oxygen may be available by employing dipyridyl oxides or diphenyl oxides in the above-mentioned reactions. Azopyridine, a compound I where X is N=N, can be prepared from the photolysis of 2,2' azopyridine as described by N. Campbell et. al. in J. Chem. Soc. 1953, 1281. Those compounds where X is S—S and $R^5$ is pyridine can be prepared by the oxidative coupling of 2-mercaptopyridines according to the method of S. Petersen in Ann. Chem. 686 115 (1965). Typical compounds I where X is N—$R^6$ and $R^5$ is pyridyl can be made according to the general technique for the preparation of bis(2-pyridyl) amine described by Wibaut et. al. in Chem. Abstracts 21, 3619 (1927). Compounds I where X is $R^6$ can be made according to the technique described by Harries and Lenart in Ann. 410, 95 (1915) wherein 1,2 bis(2 pyridyl) ethylene is made from the condensation of pyridine aldehyde and picoline.

Where $R^1$ and $R^2$ are as defined in b), other synthetic procedures are feasible. Thus, the nitroso naphthols can be prepared from the appropriate naphthol and sodium nitrite as described by C. S. Marvel and P. K. Porter in Organic Synthesis, Coll. Vol. I, 411, John Wiley and Sons, New York 1941. 8-Hydroxyquinoline is prepared by condensing o-hydroxyaniline with o-nitrophenol in the presence of $FeSO_4$ and boric acid as described by S. Kanevskaya and G. A. Melenteva, Chem. Abstracts 49, 1040 i (1955). The dipyridyls, and phenylpyridyls are made by the reaction of pyridyl or aryldiazo compounds as described by Bachmann and Hoffman in Org. Reactions, 2, 224 (1944). The mercaptobenzimidazoles are prepared by reacting o-phenylenediamine with potassium ethyl xanthate as described by J. A. Van Allan and B. D. Beacon, Org. Synthesis, Coll. Vol. IV, 569, John Wiley and Son, New York, 1963. Where Z is oxygen, 1-benzoxazolethiols can be provided according to the methods reported by H. M. Raum et. al. in Arzneim-Forsch 21, 693 (1971).

The stabilizer is generally employed in an amount from about 0.01 to about 30% by weight of the initiator and preferably from about 0.5 to about 5.0% by weight of the initiator. The initiator is generally employed in an amount from about 0.01 to about 30%, and preferably from about 1 to about 5% loading by weight of the total composition.

Photopolymerizable ethylenically unsaturated compounds useful in the compositions of this invention include acrylic, α-alkacrylic and α-chloroacrylic acid compounds such as esters, amides and nitriles. Examples of such compounds are acrylonitrile, methacrylonitrile, methyl acrylate, ethyl acrylate, methyl methacrylate, isobutyl methacrylate, 2-ethyl-hexylacrylate, methacrylamide and methyl α-chloroacrylate. Also useful, although not preferred, are vinyl and vinylidene esters, ethers and ketones. Additionally, compounds having more than one terminal unsaturation can be used. Examples of these include diallyl phthalate, diallyl maleate, diallyl fumarate, triallyl cyanurate, triallyl phosphate, ethylene glycol dimethacrylate, glycerol trimethacrylate, pentaerythritol triacrylate, pentaerythritol tetraacrylate, trimethylolpropane triacrylate, methacrylic anhydride and allyl ethers of monohydroxy or polyhydroxy compounds such as ethylene glycol diallyl ether, pentaerythritol tetraallyl ether, and the like. Nonterminally unsaturated compounds such as diethyl fumarate can similarly be used.

The derivatives of acrylic acid, which include the derivatives of methacrylic acid, are particularly well suited to the practice of the invention and are consequently preferred components as monomers in monomer-containing merizable polymers.

The photoinitiators suitable for use in the practice of this invention include various carbonyl compounds including the acetophenones, benzophenones, etc.; the acyloins; etc. Preferred are the benzoin ether initiators of the formula

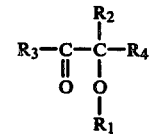

wherein $R_1$ and $R_2$ are, independently from one another, selected from hydrogen atoms, or aliphatic or aromatic hydrocarbon radicals, and $R_3$ and $R_4$ are, independently from one another, benzene nuclei, or benzene nuclei mono-di- or tri-substituted with alkyl, alkoxy, trihaloalkyl, metahydroxy, alkenedioxy groups or halogen atoms.

The benzoin ethers are known photosensitizers that may be prepared according to the method described by Whitmore in Organic Chemistry, page 405, by Fisher in Berichte, 26,2412 (1893), or by Irvine and Moodie as described in Journal Chemical Society 91,543, (1907).

Among the various benzoin ethers suitable for the purposes of the invention are in particular the phenyl, cresyl, benzyl, cyclohexyl ethers thereof and alkyl ethers therof such as the methyl, ethyl, propyl, isopropyl, butyl and isobutyl ether, and isomers thereof.

While any of the nitrogen-containing aromatic compounds having the formula I can be used in the practice of this invention, preferred are those compounds I having the formulas:

PHOTOPOLYMERIZABLE COMPOSITION STABILIZED WITH NITROGEN-CONTAINING AROMATIC COMPOUNDS

This is a division of application Ser. No. 773,370 filed Mar. 1, 1977, now U.S. Pat. No. 4,141,807.

BACKGROUND OF THE INVENTION

This invention relates to stabilized photopolymerizable compositions based on photopolymerizable ethylenically unsaturated compounds containing benzoin ether initiators. More particularly, this invention relates to the use of certain nitrogen-containing aromatic compounds as stabilizers for photopolymerizable compositions containing photoinitiators.

Photopolymerizable compositions containing unsaturated materials and photoinitiating compounds are well known in the art, being particularly useful for moldings and coatings. These materials polymerize at low temperatures when exposed to actinic radiation. While numerous compounds have been found useful as photoinitiators for the polymerization of unsaturated compounds, the ethers of benzoin have found wide-spread commercial acceptance. These benzoin ethers exhibit excellent cure rates, rendering them particularly attractive where rapid hardening is desirable. The use of benzoin ethers as photopolymerization initiators is described in U.S. Pat. No. 2,448,828.

While the benzoin ethers are widely used because of their excellent curing properties, they are not wholly satisfactory with regard to storage stability. Thus, unsaturated systems to which benzoin ethers are added have considerably diminished dark storage stability and will gell prematurely in many systems where storage is a key factor.

Various attempts have been made to remedy this deficiency of the benzoin compounds by including stabilizing additives in the photopolymerizable composition. For example, U.S. Pat. No. 2,647,080 discloses the addition of allyl glycidyl ether to systems containing halogen-free acrylate and acyloin ether initiators. U.S. Pat. No. 3,814,702 teaches a photosensitizing compositions comprising a benzoin ether, an organic acid and a solvent; optionally, a weak reducing agent may be included in the photosensitizing composition. Other multi-component stabilizing systems are described in U.S. Pat. No. 3,819,495, which discloses a copper compound soluble in polyester resin and an organic compound having ionically-bound chlorine or capable of forming chlorine ions in situ as stabilizers for polyester resins containing benzoin ethers, while U.S. Pat. No. 3,819,496 discloses similar systems employing an iron and/or manganese compound instead of the copper compound.

Other compounds have been added to benzoin ether systems as cure accelerators. For example, Japan Kokai No. 73 00, 983 discloses the use of dialkylaminobenzoins in conjunction with benzoin methyl ether as curing agents for polyester resins, while Japan Kokai No. 73 75,638 teaches mixtures of benzoin alkyl ether and p,p'-bis (dialkylamino) thiobenzophenone as curing agents that provide colored products. In German Offen. No. 2,263,804, the addition of ascorbic acid or thiourea to benzoin ethyl ether to reduce the exposure time of photopolymer printing reliefs is disclosed. While functioning to accelerate curing, many of these compounds are known to decrease the storage stability of the system.

Now it has been found in accordance with the invention that selected nitrogen-containing aromatic compounds are excellent stabilizing agents for photopolymerizable compositions containing photoinitiators. These stabilizing agents function to improve the dark storage capability of the composition without significantly detracting from the cure rate.

SUMMARY OF THE INVENTION

The stabilized photopolymerizable composition of this invention comprises an ethylenically unsaturated monomeric compound, a photoinitiator and at least one selected nitrogen-containing aromatic compound.

DETAILED DESCRIPTION OF THE INVENTION

More in detail, the photopolymerizable composition of this invention comprises at least one photopolymerizable ethylenically unsaturated compound containing a photoinitiator in an amount sufficient to initiate photopolymerization and a stabilizing amount of a nitrogen-containing aromatic compound having the formula

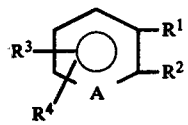

wherein
A is a carbon or nitrogen;
$R^1$ and $R^2$ are
(a) independently selected hydrogen or $-X-R^5$ where X is zero, oxygen, sulfur, $N=N$, $S-S$, $-R^6$ or $N-R^6$ where $R^6$ is hydrogen or alkylene of 1 to 6 carbon atoms, and $R^5$ is phenyl or pyridyl with the proviso that both $R^1$ and $R^2$ cannot be hydrogen; or
(b) together with the ring carbon atoms in the formula adjacent to $R^1$ and $R^2$ form a radical having the formula

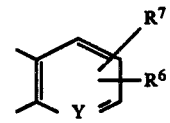

where $R^7$ and $R^8$ are independently selected hydrogen hydroxyl, nitroso or pyridylazo, and Y is nitrogen or carbon; or

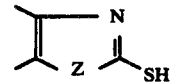

where Z is oxygen, sulfur, or $NR^9$ where $R^9$ is hydrogen or alkyl of 1 to 6 carbon atoms; and $R^3$ and $R^4$ are independently selected hydrogen, hydroxyl, or an alkali metal salt thereof; with the further proviso that said compound must contain at least one nitrogen.

Illustrative of the nitrogen-containing aromatic compounds having the formula I are 2,2'-dipyridyl; 2,3'-dipyridyl; 3-hydroxy-2,2'-dipyridyl; 2-hydroxy-2',3-dipyridyl; 2-hydroxy-2',4-dipyridyl; 2,2'-dihydroxy-2,2'-dipyridyl; 3,3'-dihydroxy-2,2'-dipyridyl; 2-(2'hy-

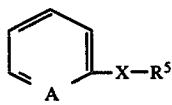

where A is carbon or nitrogen, X is zero or N—N and $R^5$ is pyridyl;

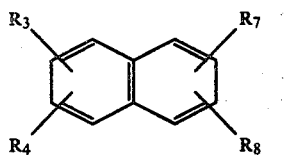

where A is carbon or nitrogen; $R^3$ and $R^4$ are hydrogen or hydroxyl and $R^7$ and $R^8$ are independently selected hydrogen, hydroxyl nitroso or pyridylazo; and

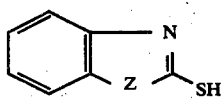

where Z is oxygen, sulfur, or $NR^9$ where $R^9$ is hydrogen or alkyl of 1 to 3 carbon atoms.

The photopolymerizable compositions of this invention have been found to have markedly enhanced dark-storage capability over corresponding systems not including the nitrogen-containing aromatic compounds I. Curing occurs upon exposure of the compositions to actinic radiation, that is, radiation in the region of about 2000 Angstroms to about 8000 Angstroms and preferably between about 2400 Angstroms and 5400 Angstroms.

The following examples will serve to illustrate the practice of this invention.

EXAMPLE 1

8-Hydroxyquinoline was added in various concentrations to samples of pentaerythritol tetraacrylate resin containing 1.3% by weight of benzoin isobutyl ether initiator. Glass jars were filled to greater than 90% by volume with the stabilized compositions, which were then stored in the dark at 65° C. Stability is reported in Table 1 as the number of days the compositions remained stable prior to gelation. While stability improved as the concentration of 8-hydroxyquinoline was increased, solubility problems were experienced at levels greater than 2% by weight.

TABLE 1

| Sample | Concentration of 8-Hydroxyquinoline (% by Wt. of Initiator) | Stability (Days at 65° C.) |
|---|---|---|
| 1 | 0 | 2 |
| 2 | 0 | 3 |
| 3 | 0.4 | 20 |
| 4 | 1.0 | 45 |
| 5 | 2.0 | 51 |
| 6 | 4.0 | 68 |
| 7 | 8.0 | 73 |
| 8 | 16.0 | 93 |

EXAMPLES 2-3

In order to demonstrate the efficacy of small concentrations of stabilizers, tests were carried out following the procedure of Example 1 and employing, as the resin system, pentaerythritol tetraacrylate containing 1.2% by weight of benzoin isobutyl ether. Stability is reported in Table 2.

TABLE 2

| Example | Stabilizer | Concentration (% by Wt. of Resin) | Stability (Days at 65° C.) |
|---|---|---|---|
| Control | None | — | 0.7 |
| 2 | 8-Hydroxyquinoline | 0.05 | 9.0 |
| 3 | 2-Nitroso-1-naphthol | 0.05 | 6.0 |

EXAMPLES 4-13

Various nitrogen-containing aromatic stabilizers were added to Satomer SR351 resin containing 3.6% by weight of benzoin isobutyl ether. Satomer SR 351 resin is trimethylolpropane triacrylate marketed by Satomer Company. Stability was determined as described in Example 1; the results are set forth in Table 3.

TABLE 3

| Example | Stabilizer | Concentration (% by Wt. of Resin) | Stability (Days at 65°C.) |
|---|---|---|---|
| Control-1 | None | — | 5.5 |
| Control-2 | None | — | 4.0 |
| 4 | 8-Hydroxyquinoline | 0.14 | 38.0 |
| 5 | 2,2'-Dipyridyl | 0.14 | 31.0 |
| 6 | 4-(2-Pyridylazo) resorcinol, sodium | 0.14 | 40.0+ |
| 7 | 1-(2-Pyridylazo)-2-naphthol | 0.14 | 18.0 |
| 8 | 1-Nitroso-2-naphthol | 0.14 | 14.0 |
| 9 | 2-Nitroso-1-naphthol | 0.14 | 28.0 |
| 10 | 2-Mercaptobenzimidazole | 0.14 | 23.0 |
| Control-3 | None | — | 4.0 |
| 11 | 1-(2-Pyridylazo) resorcinol | 1.4 | 4.0 |
| 12 | 1-Nitroso-2-naphthol | 1.4 | 4.0 |
| 13 | 2-Nitroso-1-naphthol | 1.4 | 21.0 |
| Comparative-1 | 2-Hydroxypyridine | 1.4 | 1.0 |
| Comparative-2 | 2,6 Diaminopyridine | 1.4 | 1.0 |
| Comparative-3 | Pyridine | 1.2 | 1.0 |

The above data indicates that not all nitrogen-containing aromatic compounds are effective stabilizers for photoinitiators. Thus, pyridine and the substituted pyridines reported as Comparative Examples 1-3 were found to destabilize the photoinitiator system.

EXAMPLES 14-19

These examples reflect stability tests in a typical polyester-styrene resin, available from PPG Industries, Pittsburgh, Pa., containing 3.6% by weight of benzoin isobutyl ether. The testing was carried out following the procedure described in Example 1; the results are reported in Table 4.

TABLE 4

| Example | Stabilizer | Concentration (% by Wt. of Resin) | Stability (Days at 65° C.) |
|---|---|---|---|
| Control | None | — | 2.0 |
| 14 | 1-(2-Pyridylazo)-2-naphthol | 1.4 | 18.0 |
| 15 | 1-(2-Pyridylazo)-2-naphthol | 0.14 | 3.0 |
| 16 | 2,2'Dipyridyl | 0.05 | 5.0 |

TABLE 4-continued

| Example | Stabilizer | Concentration (% by Wt. of Resin) | Stability (Days at 65° C.) |
|---|---|---|---|
| | | | 7.0 |
| 17 | 8-Hydroxyquinoline | 1.4 | 1.0 |
| 18 | 8-Hydroxyquinoline | 0.05 | 1.0 |
| 19 | 2-Nitroso-1-naphthol | 0.05 | 7.0 |

EXAMPLE 20

The following stability tests indicate a synergistic effect when 8-hydroxyquinoline and phenyl-α-naphthylamine are used to stabilize a certain resin, namely, the trimethylol-propane triacrylate marketed by Celanese Corp. The testing was carried out in accordance with the procedure described in Example 1; the results are set forth in Table 5. All the resins contained benzoin isobutyl ether as the initiator.

TABLE 5

| Stabilizer and Concentration as Wt. % of Initiator | Stability (Days at 65° C.) | | |
|---|---|---|---|
| | Satomer[1] SR351 | Celanese[2] | Union Carbide[3] PEA |
| 1.0% 8-Hydroxyquinoline | 14(38)[4] | 2 | 7 |
| 0.2% Phenyl-α-naphthylamine | 10 | 6 | 2 |
| 1.0% 8-Hydroxyquinoline 0.2% Phenyl-α-naphthylamine | 20 | 69 | 8 |

[1] Initiator loading of 3.6% by weight of Satomer SR351, which is trimethylolpropane triacrylate marketed by Satomer Company.
[2] Initiator loading of 3.6% by weight of trimethylolpropane triacrylate marketed by Celanese Corp.
[3] Initiator loading of 1.2% by weight of penetaerythritol triacrylate marketed by Union Carbide Corp.
[4] The result of 38 days stability reflected an earlier test not part of the series reported herein.

EXAMPLE 21

This example indicates synergism for certain levels of 8-hydroxyquinoline and phenyl-α-naphthylamine in Satomer SR351 trimethylolpropane triacrylate containing 3.6% by weight of benzoin isobutyl ether. Stability, determined as described in Example 1, is reported in Table 6.

TABLE 6

| Sample | Stabilizer and Concentration as Wt.% of Initiator | Stability (Days at 65° C.) |
|---|---|---|
| 1 | 0.14% 8-Hydroxyquinoline | 37,14 |
| 2 | 1.2% Phenyl-α-naphthylamine | 5 |
| 3 | 0.07% 8-Hydroxyquinoline and 0.07% Phenyl-α-naphthylamine | 26 |

EXAMPLE 21

This example illustrates that the cure rate of the compositions was not adversely affected by the stabilizers of this invention. The resin system, which is defined in Table 7, contained 3.6% by weight benzoin isobutyl ether.

The cure rates were determined using a source of actinic light a PPG Model QC 1202 AN UV Processor manufactured by PPG Industries, Inc. The radiation source for this apparatus consists of two high intensity, medium pressure quartz mercury lamps 12 inches in length and each operating at a linear power density of about 200 watts per inch or 2400 watts per lamp. The lamps are housed in an elliptical reflector above a variable speed conveyor belt and each lamp provides a 2-inch band of high flux actinic radiation on the conveyor. This 2-inch exposure area is bordered on both sides by an additional 2-inch area of medium flux energy for a total radiation area of 6 inches for each lamp. In the curing data presented below, cure rate of the polymerizable compositions is presented in feet-per-minute-per-lamp (ft./min./lamp). Thus, a conveyor belt speed of one foot/min. will, with a 12-inch exposure area for the two lamps, provide 60 seconds of exposure or a cure rate of 0.5 ft./min./lamp. Similarly, a belt speed of 10 ft./min. will provide 6 seconds of exposure or a rate of 5.0 ft./min./lamp while a speed of 20.0 ft./min. will give 3 seconds exposure or a rate of 10 ft./min./lamp, etc.

The results are reported in Table 7.

TABLE 7

| Sample | Stabilizer and Concentration as Wt. % of Initiator | Cure Rate (Air) Ft./min./Lamp |
|---|---|---|
| 1 | None | 7.5 |
| 2 | 4% 1-(2-Pyridylazo)-2-naphthol | 7.5 |
| 3 | 4% 1-(2-Pyridylazo)-(resorcinol) | |
| 4 | 2% 8-Hydroxyquinoline and 2% Phenyl-α-naphthylamine | 6.5 |

The resin system consisted of 42% by weight of trimethylolpropane triacrylate, 17% by weight of ethylhexyl acrylate and 41% by weight of ACTOMER-80® Resin, and unsaturated long chain linseed oil alkyl resin, available from Union Carbide Corporation.

What is claimed is:

1. A process for preparing a photopolymerizable composition comprising forming a mixture containing a photopolymerizable ethylenically unsaturated compound, a benzoin ether in an amount sufficient to initiate photopolymerization and a stabilizing amount of a stabilizer having the formula:

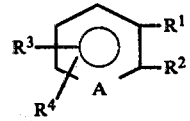

wherein A is a carbon or nitrogen; $R^1$ and $R^2$ are independently selected hydrogen or $-X-R^5$ where X is zero, oxygen, sulfur, $N=N$, $S-S$, $-R^6$ or $N-R^6$ where $R^6$ is hydrogen or alkyl of 1 to 6 carbon atoms, and $R^5$ is phenyl or pyridyl with the proviso that both $R^1$ and $R^2$ cannot be hydrogen; and $R^3$ and $R^4$ are independently selected hydrogen, hydroxyl, or an alkali metal salt thereof; with the further proviso that said stabilizer must contain at least one nitrogen.

2. The process of claim 1 wherein said benzoin ether is present in said composition at a concentration of about 0.01 to about 30 percent by weight, and said stabilizer is present at a concentration of about 0.01 to about 30 percent by weight of said benzoin ether.

3. The process of claim 2 wherein said stabilizer has the formula:

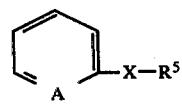

where A is carbon or nitrogen; X is zero or N=N and R⁵ is pyridyl.

4. The process of claim 3 wherein said stabilizer is 2,2'dipyridyl.

5. The process of claim 3 wherein said stabilizer is a pyridylazo resorcinol.

6. The process of claim 5 wherein said stabilizer is 4-(2 pyridylazo)-resorcinol sodium salt.

7. A photopolymerizable composition comprising at least one photopolymerizable ethylenically unsaturated compound containing a benzoin ether in an amount sufficient to initiate photopolymerization and a stabilizing amount of a stabilizer having the formula:

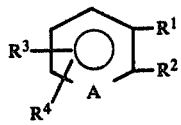

wherein A is carbon or nitrogen; R¹ and R² are independently selected hydrogen or —X—R⁵ where X is zero, oxygen, nitrogen, N=N, S—S, —R⁶ or N—R⁶ where R⁶ is hydrogen or alkyl of 1 to 6 carbon atoms, and R⁵ is phenyl or pyridyl with the proviso that both R¹ and R² cannot be hydrogen; and R³ and R⁴ are independently selected hydrogen, hydroxyl, or an alkali metal salt thereof, with the proviso that said stabilizer must contain at least one nitrogen.

8. The composition of claim 7 wherein said benzoin ether is present in said composition at a concentration of about 0.01 to about 30 percent by weight, and said stabilizer is present at a concentration of about 0.01 to about 20 percent by weight of said benzoin ether.

9. The composition of claim 8 wherein said stabilizer has the formula:

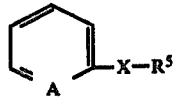

where A is carbon or nitrogen; X is zero or N=N and R⁵ is pyridyl.

10. The composition of claim 9 wherein said stabilizer is 2,2'dipyridyl.

11. The composition of claim 9 wherein said stabilizer is a pyridylazo resorcinol.

12. The composition of claim 11 wherein said stabilizer is 4-(2 pyridylazo)-resorcinol sodium salt.

* * * * *

UNITED STATES PATENT AND TRADEMARK OFFICE
CERTIFICATE OF CORRECTION

PATENT NO. : 4,204,928
DATED : May 27, 1980
INVENTOR(S) : Francis A. Via

It is certified that error appears in the above-identified patent and that said Letters Patent are hereby corrected as shown below:

On the title page

Under U.S. Patent Documents - Attorney, Agent, or Firm - "Francis A. Via" should read -- Michael E. Zall --;

Col. 2, line 45, in the formula "$R^6$" should read -- $R^8$ --;

Col. 4, line 31, after containing insert -- polymerizable systems and as reactive centers in poly- --;

Col. 5, line 8, "N-N" should read -- N=N --.

Signed and Sealed this

Nineteenth Day of July 1983

[SEAL]

Attest:

Attesting Officer

GERALD J. MOSSINGHOFF

Commissioner of Patents and Trademarks